United States Patent
Sakagawa et al.

(10) Patent No.: US 11,807,262 B2
(45) Date of Patent: Nov. 7, 2023

(54) CONTROL DEVICE, MOVING BODY, CONTROL METHOD, AND COMPUTER-READABLE STORAGE MEDIUM

(71) Applicant: HONDA MOTOR CO., LTD., Tokyo (JP)

(72) Inventors: Yuta Sakagawa, Saitama (JP); Shigeru Inoue, Saitama (JP); Takahiro Kurehashi, Saitama (JP); Moriya Horiuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/830,332

(22) Filed: Jun. 2, 2022

(65) Prior Publication Data

US 2022/0388528 A1 Dec. 8, 2022

(30) Foreign Application Priority Data

Jun. 7, 2021 (JP) .................................. 2021-095297

(51) Int. Cl.
*H04N 5/44* (2011.01)
*B60W 50/14* (2020.01)
(Continued)

(52) U.S. Cl.
CPC .......... *B60W 50/14* (2013.01); *B60W 30/095* (2013.01); *B60W 60/0027* (2020.02); *G08G 1/166* (2013.01); *B60W 2050/143* (2013.01)

(58) Field of Classification Search
CPC .............. B60W 50/14; B60W 30/095; B60W 60/0027; B60W 2050/143; G08G 1/166; G08G 1/164
See application file for complete search history.

(56) References Cited

U.S. PATENT DOCUMENTS 11,069,243 B2 * 7/2021 Nordbruch ............... H04W 4/40
11,189,173 B1 * 11/2021 Esselink ................. G08G 1/166
(Continued)

FOREIGN PATENT DOCUMENTS

CN      106816035 A    6/2017
JP      2008021269 A   1/2008
(Continued)

OTHER PUBLICATIONS

Office Action issued for counterpart Chinese Application 202210472814. X, issued by The State Intellectual Property Office of People's Republic of China dated Jun. 14, 2023.

*Primary Examiner* — Munear T Akki

(57) ABSTRACT

A control device includes: an acquisition unit configured to acquire information indicating a location of a warning target, and the number of the warning targets, the warning target being recognized from an image captured by an image capture device mounted on a moving body; a reception control unit configured to perform a control to receive, from a plurality of external terminals existing near the location of the warning target acquired by the acquisition unit, trajectory information indicating a past movement trajectory of each of the plurality of external terminals; a selection unit configured to select, from among the plurality of external terminals, one or more external terminals that are transmission targets of warning information based on the past movement trajectory; and a transmission control unit configured to perform a control to transmit the warning information to the one or more external terminals selected by the selection unit.

13 Claims, 6 Drawing Sheets

(51) Int. Cl.
*B60W 30/095* (2012.01)
*G08G 1/16* (2006.01)
*B60W 60/00* (2020.01)

(56) References Cited

U.S. PATENT DOCUMENTS

| | | |
|---|---|---|
| 2016/0238395 A1 | 8/2016 | Boukallel |
| 2018/0025636 A1* | 1/2018 | Boykin ............ G08G 1/096725 |
| | | 701/1 |
| 2018/0042039 A1 | 2/2018 | Senba |
| 2018/0170373 A1* | 6/2018 | Kwon .................... G08G 1/165 |
| 2021/0347353 A1* | 11/2021 | Park ..................... B60W 30/08 |

FOREIGN PATENT DOCUMENTS

| | | |
|---|---|---|
| JP | 2016173652 A | 9/2016 |
| JP | 2018022391 A | 2/2018 |
| WO | 2015058986 A1 | 4/2015 |

\* cited by examiner

CONTROL DEVICE, MOVING BODY, CONTROL METHOD, AND COMPUTER-READABLE STORAGE MEDIUM

The contents of the following Japanese patent application(s) are incorporated herein by reference:
NO. 2021-095297 filed on Jun. 7, 2021.

BACKGROUND

1. Technical Field

The present invention relates to a control device, a moving body, a control method, and a computer-readable storage medium.

2. Related Art

Patent Document 1 discloses a technology in which when a pedestrian who has been detected is not detected any longer, a current location of the pedestrian is estimated and stored by tracking a movement trajectory of the pedestrian from a time series change in a location of the pedestrian that has been stored.

PRIOR ART DOCUMENT

Patent Document 1

Japanese Patent Application Publication No. 2008-021269

DESCRIPTION OF EXEMPLARY EMBODIMENTS

Hereinafter, the present invention will be described through embodiments of the invention, but the following embodiments do not limit the invention according to the claims. In addition, not all of the combinations of features described in the embodiments are essential for means to solve the problem in the invention.

Figure 1:
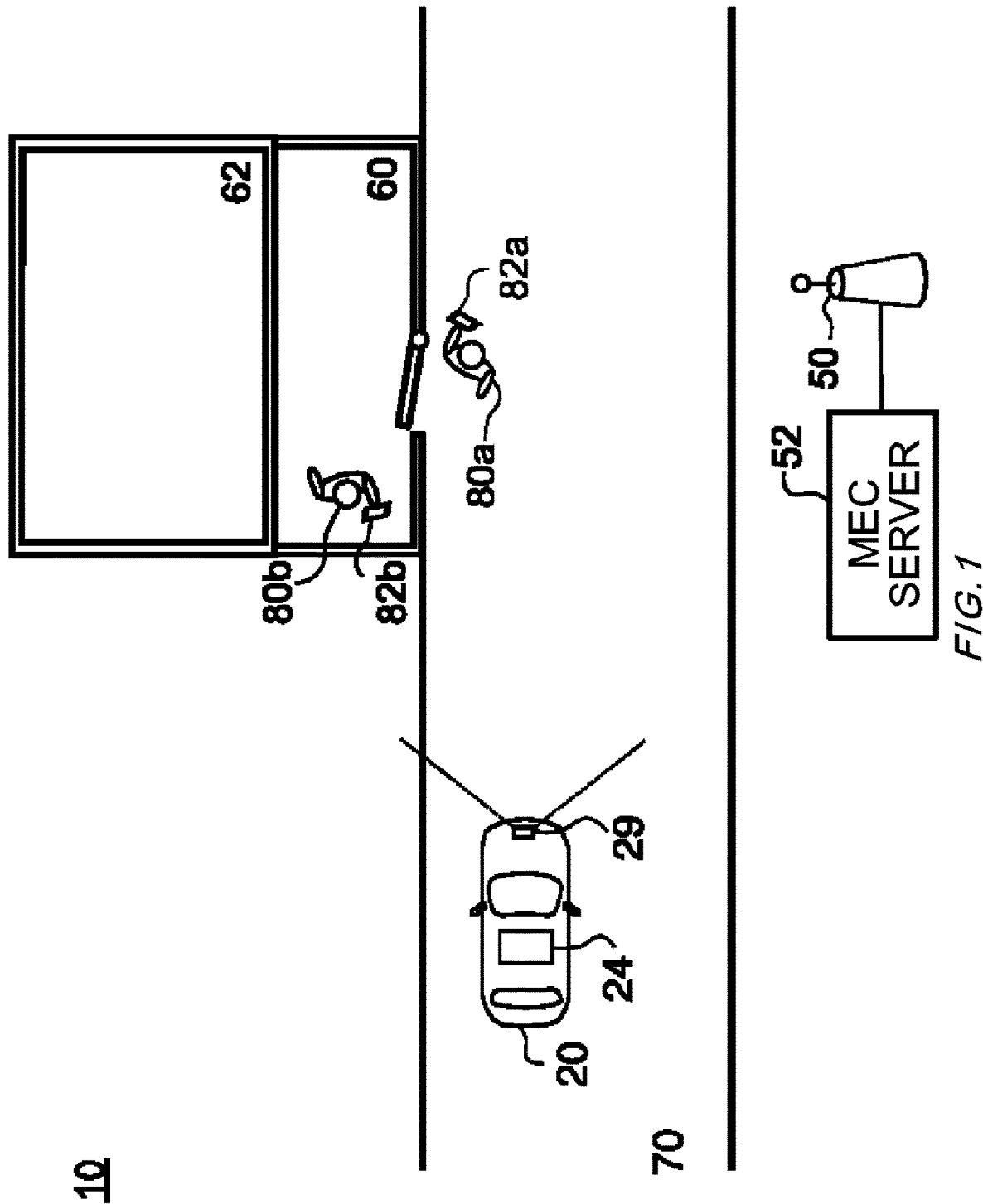
FIG. 1 schematically shows a scene in which a warning system 10 is used.

FIG. 1 schematically shows a scene in which a warning system 10 is used. The warning system 10 includes a vehicle 20, a terminal 82a and a terminal 82b, a base station 50, and a MEC server 52.

The terminal 82a and the terminal 82b are terminals that are carried by a person 80a and a person 80b, respectively. In the present embodiment, the person 80a and the person 80b may be collectively referred to as a "person 80". In addition, the terminals 82a and 82b may be collectively referred to as a "terminal 82". It should be noted that in the present embodiment, a control is performed on the assumption that the terminal 82 is located close to the person 80. That is, it is assumed that selecting the terminal 82 has the same meaning as selecting the person 80.

The vehicle 20 is an example of a moving body. The vehicle 20 includes a sensor 29 and a control device 24. The sensor 29 is configured to include a camera. The control device 24 has a function of processing information acquired by the sensor 29, and a communication function.

In FIG. 1, it is assumed that the vehicle 20 is traveling along a road 70. It is assumed that the person 80a is a person who is outside premises of a house 62. It is assumed that the person 80b is a person working in a garden 60 inside the premises of the house 62. The terminal 82 acquires current location information of the terminal 82 in a comparatively short cycle, and stores acquired time series location information in the terminal 82 as trajectory information indicating a movement trajectory. As an example, a period of the location information which is stored as the trajectory information may be, for example, a latest period of approximately several minutes to several tens of minutes. The terminal 82 transmits the current location information to the MEC server 52 at a predetermined cycle. This makes the MEC server 52 store a latest current location of the terminal 82.

When the person 80a is recognized from an image obtained by a camera function of the sensor 29, the control device 24 of the vehicle 20 transmits, to the MEC server 52 through the base station 50, recognition information which includes location information (referred to as "recognition location information") indicating a location of the recognized person 80a, and the number of recognized persons 80 (referred to as "the number of recognized persons"). In the example of FIG. 1, the control device 24 does not recognize the person 80b existing in the garden 60, and thus one person is recognized.

The MEC server 52 specifies, as a candidate for a warning target, the terminal 82 existing within a predetermined range including the location indicated by the recognition location information, based on the latest current location of the terminal 82, and the recognition location information included in the recognition information received from the control device 24. The terminal 82b is located comparatively close to the terminal 82a, and thus the terminal 82a and the terminal 82b are selected as candidates for the warning target. Therefore, the number of the terminals 82 selected as the candidates for the warning target is two. The number of the terminals selected as the candidates for the warning target is called "the number of the candidates for the warning target".

When the number of the candidates for the warning target is larger than the number of the recognized persons, the MEC server 52 receives the trajectory information from the terminal 82 selected as the candidate for the warning target. The MEC server 52 selects a specific warning target from among the candidates for the warning target based on the trajectory information. For example, the MEC server 52 determines that the terminal 82b has not been on a road outside the premises of the house 62 for a predetermined period based on the trajectory information, and excludes the terminal 82b from the warning target. The MEC server 52 determines that the terminal 82a is on the road outside the premises of the house 62 based on the trajectory information, and includes the terminal 82a in the warning target.

The MEC server 52 transmits warning information to the terminal 82 selected as the warning target. In addition, the MEC server 52 transmits, to the control device 24 of the vehicle 20, the warning information including the location of the terminal 82 selected as the warning target. The control device 24 causes the vehicle 20 to display the warning information for an occupant of the vehicle 20 based on the warning information.

It should be noted that when transmitting the recognition information, the control device 24 of the vehicle 20 may perform, without specifying a destination, the transmission for the recognition information to be able to be received by the terminal 82, rather than to the MEC server 52. When receiving the recognition information, the terminal 82 may transmit, to the control device 24, response information including the trajectory information. When the number of the terminals 82 that are transmission sources of the received response information is larger than the number of the recognized persons, the control device 24 may select the terminal 82 that is the warning target based on the trajectory information. It should be noted that as a method for selecting the terminal 82 that is the warning target, the same method as the method in which the MEC server 52 selects the terminal 82 that is the warning target can be adopted. The control device 24 transmits the warning information to the terminal 82 selected as the warning target, and causes the vehicle 20 to display the warning information for the occupant of the vehicle 20.

With the warning system 10, it is possible to suppress the transmission of the warning information to the terminal 82b that is carried by the person 80b who is working in the garden 60. This makes it possible to suppress an unnecessary transmission of an alert. In addition, it is possible to transmit accurate alert information to the vehicle 20. Therefore, it is possible for the vehicle 20 to appropriately perform the control based on the accurate warning information.

Figure 2:
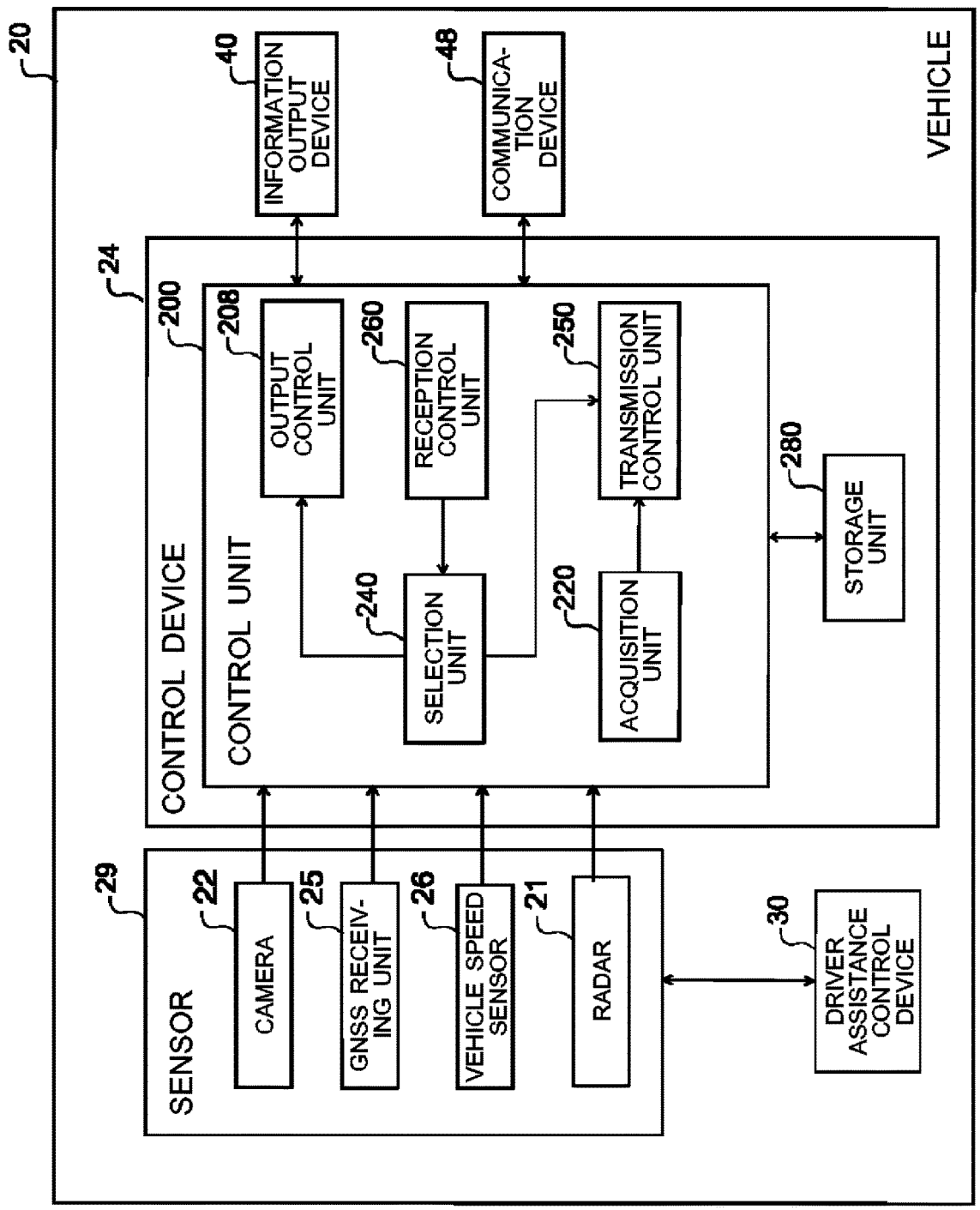
FIG. 2 shows a system configuration of a vehicle 20.

FIG. 2 shows a system configuration of a vehicle 20. The vehicle 20 includes the sensor 29, the control device 24, a communication device 48, an information output device 40, and a driver assistance control device 30.

The sensor 29 includes a camera 22, a GNSS receiving unit 25, a vehicle speed sensor 26, and radar 21. The radar 21 may be LiDAR, millimeter wave radar, or the like. The GNSS receiving unit 25 receives radio waves transmitted from a GNSS satellite. The GNSS receiving unit 25 generates information indicating a current location of the vehicle 20 based on a signal received from the GNSS satellite. The camera 22 is an example of an image capture unit that is mounted on the vehicle 20. The camera 22 captures surroundings of the vehicle 20 and generates image information. For example, the camera 22 captures an image in a traveling direction of the vehicle 20 and generates the image information. The camera 22 may be a monocular camera. The camera 22 may be a compound eye camera, and may be a camera capable of acquiring distance information to an object. It should be noted that the sensor 29 may include a location sensor such as an odometer and an IMU (inertial measurement unit) such as an acceleration sensor and a posture sensor.

The driver assistance control device 30 uses information detected by the sensor 29 to provide driver assistance for the vehicle 20. The driver assistance control device 30 may be realized by an ECU having a function of an advanced driver-assistance system (ADAS; Advanced Driver-Assistance Systems).

The communication device 48 is responsible for a direct communication with the terminal 82 and the MEC server 52. The communication device 48 may communicate with the terminal 82 through a PC5 interface.

The control device 24 includes a control unit 200 and a storage unit 280. The control unit 200 is realized, for example, by a circuit of a calculation processing device or the like including a processor. The storage unit 280 is realized by including a non-volatile storage medium. The control unit 200 performs processing by using information stored in the storage unit 280. The control unit 200 may be realized by an ECU (Electronic Control Unit) including a microcomputer including a CPU, a ROM, a RAM, an I/O, a bus, and the like.

The information output device 40 is a device that outputs the alert information. The information output device 40 may have an HMI (Human Machine Interface) function. The information output device 40 may include a head-up display and a navigation system. The information output device 40 may be a mobile terminal that is carried by the occupant of the vehicle 20. The information output device 40 may be a voice output device that outputs the alert information by a voice.

The control unit 200 includes an acquisition unit 220, a selection unit 240, an output control unit 208, a transmission control unit 250, and a reception control unit 260. A mode in which the control unit 200 does not have some function of functional blocks shown in FIG. 2 may be adopted. For example, a mode in which only functions of the acquisition unit 220 and the selection unit 240 are implemented in the control unit 200, and other functions are implemented as functions of other circuits such as the sensor 29 may be adopted.

The acquisition unit 220 is configured to acquire information indicating a location of the warning target, and the number of the warning targets, the warning target being recognized from the image captured by the camera 22 mounted on the vehicle 20. For example, the acquisition unit 220 may acquire the information indicating the locations and the number of the persons 80 by performing, on the image captured by the camera 22, processing of recognizing the persons.

The reception control unit 260 is configured to perform a control to receive, from a plurality of terminals 82 existing near the location of the warning target acquired by the acquisition unit 220, the trajectory information indicating a past movement trajectory of each of the plurality of terminals 82. The selection unit 240 is configured to select, from among the plurality of terminals 82, one or more terminals 82 that are transmission targets of the warning information based on the past movement trajectory of each of the plurality of terminals 82, when the number of the plurality of terminals 82 is larger than the number of the warning targets acquired by the acquisition unit 220. The transmission control unit 250 is configured to perform a control to transmit the warning information to the one or more terminals 82 selected by the selection unit 240.

The transmission control unit 250 may perform a control to transmit, without specifying the destination, the information including the location of the warning target acquired by the acquisition unit 220. The transmission control unit 250 may perform the control to transmit the information including the location of the warning target by broadcasting.

The reception control unit 260 may perform a control to receive the trajectory information, from the plurality of terminals 82, as a response to the information transmitted by the control of the transmission control unit 250. The transmission control unit 250 may specify, as destinations, the one or more terminals 82 selected by the selection unit 240 to perform the control to transmit the warning information.

The transmission control unit 250 may perform a control to transmit the warning information to the plurality of terminals 82 when the number of the plurality of terminals 82 matches the number of the warning targets acquired by the acquisition unit 220. This makes it possible for the warning information to be transmitted without acquiring the trajectory information from the terminal 82.

The selection unit 240 may specify, among the plurality of terminals 82, the terminal 82 that is not in an area where the vehicle 20 is capable of traveling based on the past movement trajectory of each of the plurality of terminals 82, and exclude the specified terminal 82 from a transmission target of the warning information.

The transmission control unit 250 may perform a control to transmit location information including coordinate information of the location of the warning target acquired by the acquisition unit 220. The coordinate information of the location of the warning target may include a plurality of pieces of coordinate information indicating ranges where persons are recognized. The coordinate information may be coordinate information representing a geographical location. When a range where a person is recognized is a polygon, the coordinate information of the range where the person is recognized may be coordinate information of vertices of the polygon. For the range where a person is recognized, specific coordinate information, and distance information from a location indicated by the coordinate information, may be included. For example, coordinate information of a specific point within the range where the person is recognized, and distance information indicating a width of the range where the person is recognized with respect to the point, may be included.

The output control unit 208 may control the driver assistance for the vehicle 20 or an execution of a warning to the occupant of the vehicle 20. For example, the output control unit 208 causes the information output device 40 to output the warning information in relation to the terminal 82 selected by the selection unit 240. As an example, the output control unit 208 may control travel of the vehicle 20 by controlling the driver assistance control device 30. In a case where the information output device 40 includes the head-up display, the output control unit 208 may cause the head-up display to display a mark indicating that the person 80 exists at the location of the terminal 82 selected by the selection unit 240. The output control unit 208 causes the head-up display to output light for forming the mark in a display area corresponding to the location of the terminal 82. The output control unit 208 may cause the mark, which is provided on a windshield of the vehicle 20, to be displayed. The output control unit 208 may output the warning information by the voice or characters. The output control unit 208 may control the travel of the vehicle 20 through the driver assistance control device 30.

Figure 3:
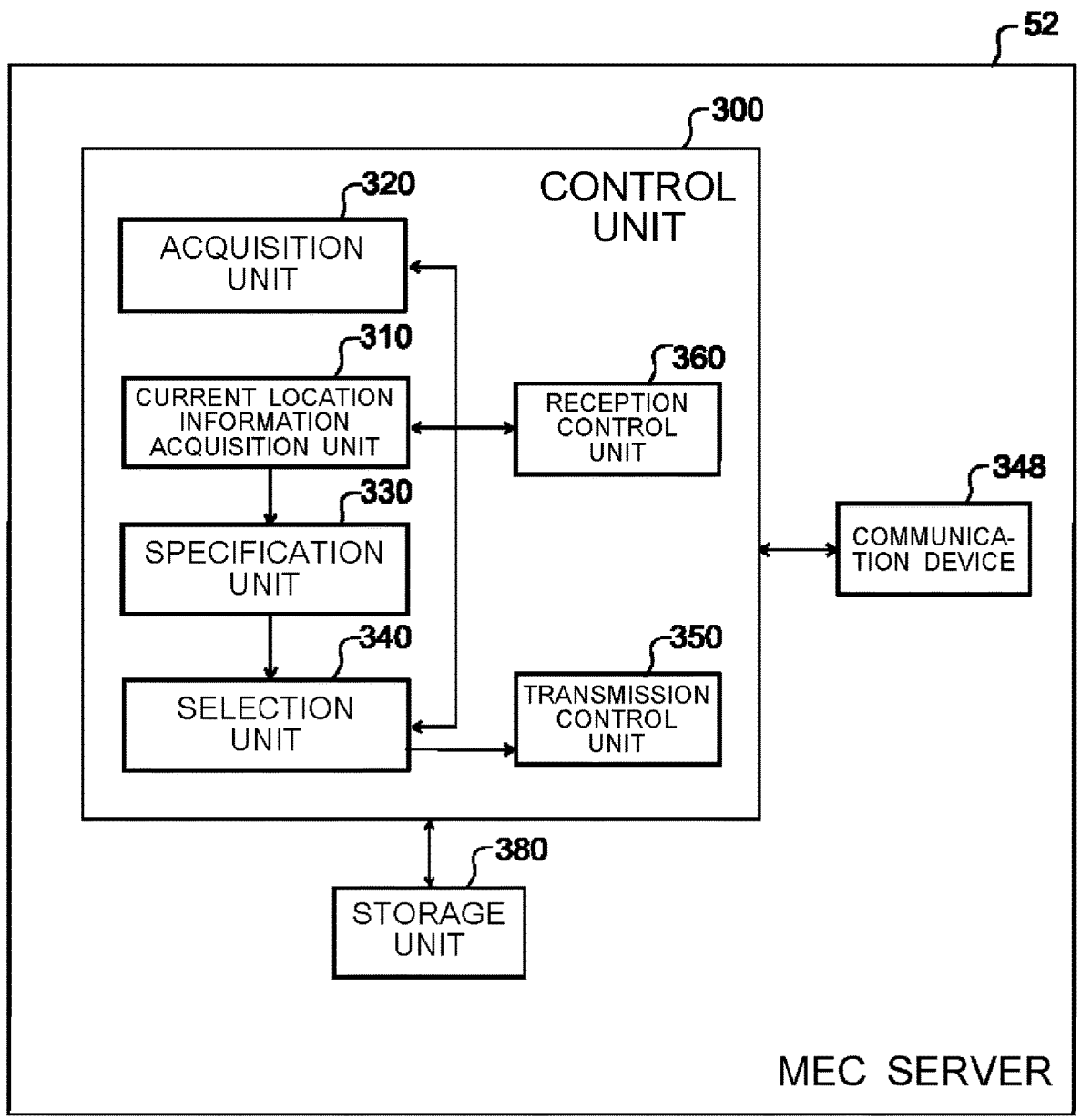
FIG. 3 shows a system configuration of a MEC server 52.

FIG. 3 shows a system configuration of a MEC server 52. The MEC server 52 includes a communication device 348, a control unit 300, and a storage unit 380.

The control unit 300 controls the communication device 348. The communication device 348 is responsible for a communication with the terminal 82 and the control device 24. The control unit 300 is realized, for example, by a circuit of a calculation processing device or the like including a processor. The storage unit 380 is realized by including a non-volatile storage medium. The control unit 300 performs processing by using information stored in the storage unit 380. The control unit 300 may be realized by a microcomputer including a CPU, a ROM, a RAM, an I/O, a bus, and the like.

The control unit 300 includes a current location information acquisition unit 310, an acquisition unit 320, a specification unit 330, a selection unit 340, a transmission control unit 350, and a reception control unit 360. The MEC server 52 can function as a "control device" including the acquisition unit 320, the specification unit 330, the selection unit 340, the transmission control unit 350, and the reception control unit 360. It should be noted that a mode in which the control unit 300 does not have some function of functional blocks shown in FIG. 3 may be adopted. For example, a mode in which only functions of the acquisition unit 320 and the selection unit 340 are implemented in the control unit 300, and other functions are implemented as functions of other circuits such as the sensor 29 may be adopted.

The acquisition unit 320 is configured to acquire the information indicating the location of the warning target, and the number of the warning targets, the warning target being recognized from the image captured by the camera 22 mounted on the vehicle 20. Specifically, the acquisition unit 320 is configured to receive, from the vehicle 20, the information indicating the location of the warning target, and the number of the warning targets. More specifically, the acquisition unit 320 may acquire, from the recognition information received from the control device 24, the information indicating the location of the warning target, and the number of the warning targets.

The selection unit 340 is configured to perform, with the reception control unit 360, a control to receive, from a plurality of terminals 82 existing near the location of the warning target acquired by the acquisition unit 320, the trajectory information indicating the past movement trajectory of each of the plurality of terminals 82. The selection unit 340 is configured to select, from among the plurality of terminals 82, one or more terminals 82 that are the transmission targets of the warning information based on the past movement trajectory of each of the plurality of terminals 82, when the number of the plurality of terminals 82 is larger than the number of the warning targets acquired by the acquisition unit 220. The transmission control unit 350 is configured to perform a control to transmit the warning information to the one or more terminals 82 selected by the selection unit 340.

The current location information acquisition unit 310 is configured to acquire the current location information of the terminal 82. The specification unit 330 is configured to specify the terminal 82 existing near the location of the warning target received from the vehicle 20 based on the current location information. The reception control unit 360 is configured to perform a control to receive the trajectory information indicating the past movement trajectory of each of the terminals 82, and the selection unit 340 is configured to select, from among the plurality of terminals 82, the one or more terminals 82 that are the transmission targets of the warning information based on the past movement trajectory of each of the plurality of terminals 82, when the number of the terminals 82 specified by the specification unit 330 is larger than the number of the warning targets received from the vehicle 20. It should be noted that the transmission control unit 350 is configured to perform a control to transmit the warning information to the terminal 82 specified by the specification unit 330 when the number of the terminals 82 specified by the specification unit 330 matches the number of the warning targets received from the vehicle 20.

Figure 4:
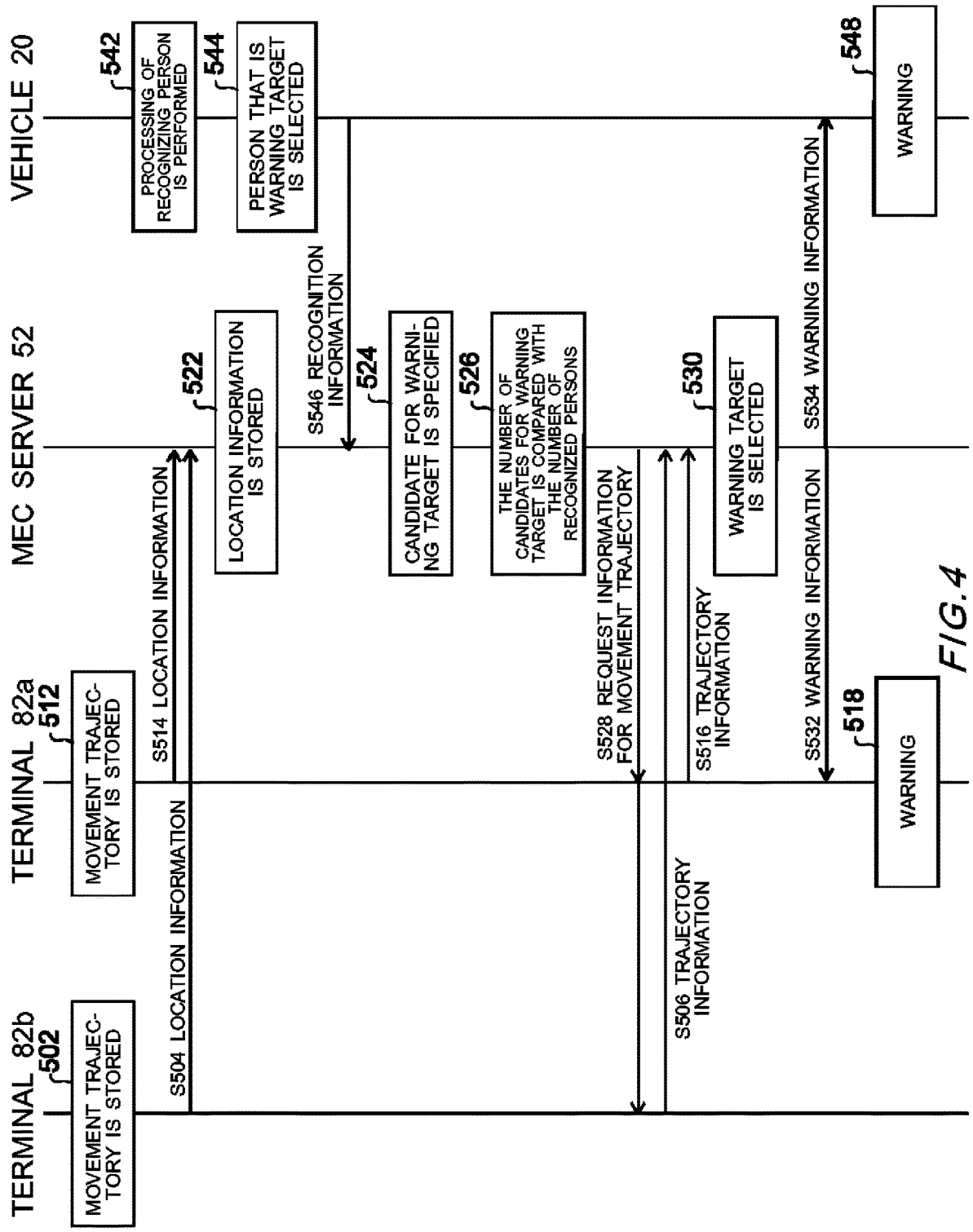
FIG. 4 schematically shows a flow of processing executed by a terminal 82, the MEC server 52, and the vehicle 20.

FIG. 4 schematically shows a flow of processing executed by a terminal 82, the MEC server 52, and the vehicle 20. FIG. 4 shows the flow of the processing when the MEC server 52 is responsible for the processing of selecting the warning target based on the trajectory information.

In S512, the terminal 82a repeats the processing of storing the movement trajectory in the terminal 82a by storing the location information of the terminal 82*a* in time series. Similarly, in S502, the terminal 82*b* repeats the processing of storing the movement trajectory in the terminal 82*b* by storing the location information of the terminal 82*b* in time series. In S514, the terminal 82*a* periodically transmits the current location information of the terminal 82*a* to the MEC server 52. Similarly, in S504, the terminal 82*b* periodically transmits the current location information of the terminal 82*b* to the MEC server 52. In S522, the current location information acquisition unit 310 of the MEC server 52 stores, in the storage unit 380, the acquired latest current location information of the terminal 82. The processing of S502, S512, S504, and S514 is continuously performed.

In S542, the acquisition unit 220 of the vehicle 20 performs, on the image acquired by the camera 22, the processing of recognizing the person 80, and acquires the locations and the number of the recognized persons 80. In S544, the acquisition unit 220 selects the person 80 that is the warning target. For example, the acquisition unit 220 may select, as the person that is the warning target, the person 80 at a location at which a distance from the vehicle 20 is less than or equal to a predetermined distance.

In S546, the recognition information including the recognition location information, and the number of the recognized persons is transmitted to the MEC server 52. In S524, if the MEC server 52 receives the recognition information, the specification unit 330 specifies the terminal 82 that is the candidate for the warning target based on the current location information of the terminal 82 stored in the storage unit 380, and the recognition location information included in the recognition information. In the present embodiment, the specification unit 330 specifies, as the candidate for the warning target, the terminal 82*a* and the terminal 82*b* located within a predetermined distance from the location indicated by the recognition location information.

In S526, the number of the candidates for the warning target specified by the specification unit 330 is compared with the number of the recognized persons included in the recognition information, and it is determined whether the number of the candidates for the warning target is larger than the number of the recognized persons. Under the situation shown in FIG. 1, while the one person is recognized, the number of the candidates for the warning target is two, it is determined that the number of the candidates for the warning target is larger than the number of the recognized persons. In this case, in S528, the transmission control unit 250 transmits request information for requesting the movement trajectory to the terminal 82*a* and the terminal 82*b* specified by the specification unit 330.

In S516, the terminal 82*a* transmits the trajectory information to the MEC server 52 as response information to the request information for the movement trajectory. In addition, in S506, the terminal 82*b* transmits the trajectory information to the MEC server 52 as response information to the request information for the movement trajectory. In S530, the selection unit 340 selects the warning target based on the trajectory information received from the terminal 82*a* and the terminal 82*b*. For example, the selection unit 340 selects, as the warning target, the terminal 82 that has been on the road 70 for a period from a current time to a predetermined time before, based on the trajectory information of the terminal 82. For example, the selection unit 340 determines that the terminal 82*a* is on the road 70, and selects the terminal 82*a* as the warning target. On the other hand, the selection unit 340 determines that the terminal 82*b* is not on the road 70, and does not select the terminal 82*b* as the warning target.

In S532, the transmission control unit 350 transmits the warning information to the terminal 82*a* selected by the selection unit 340. In addition, in S534, the transmission control unit 350 transmits, to the vehicle 20, the warning information including the location information of the terminal 82*a* selected by the selection unit 340.

In S518, if the terminal 82*a* receives the warning information from the MEC server 52, the terminal 82*a* performs a warning operation. For example, the terminal 82*a* provides a notification of the warning information by the HMI function of the terminal 82*a*. In S548, if the control device 24 receives the warning information from the MEC server 52, the control device 24 performs the warning operation. For example, the output control unit 208 causes the warning information to be notified to the occupant in the vehicle 20 through the HMI function of the information output device 40.

It should be noted that if it is determined in S526 that the number of the candidates for the warning target, and the number of the recognized persons match with each other, the processing of S528, S506, and S516 is not performed, and in S530, the selection unit 340 selects, as the terminal of the warning target, the terminal 82 specified by the specification unit 330 as the candidate for the warning target.

Figure 5:
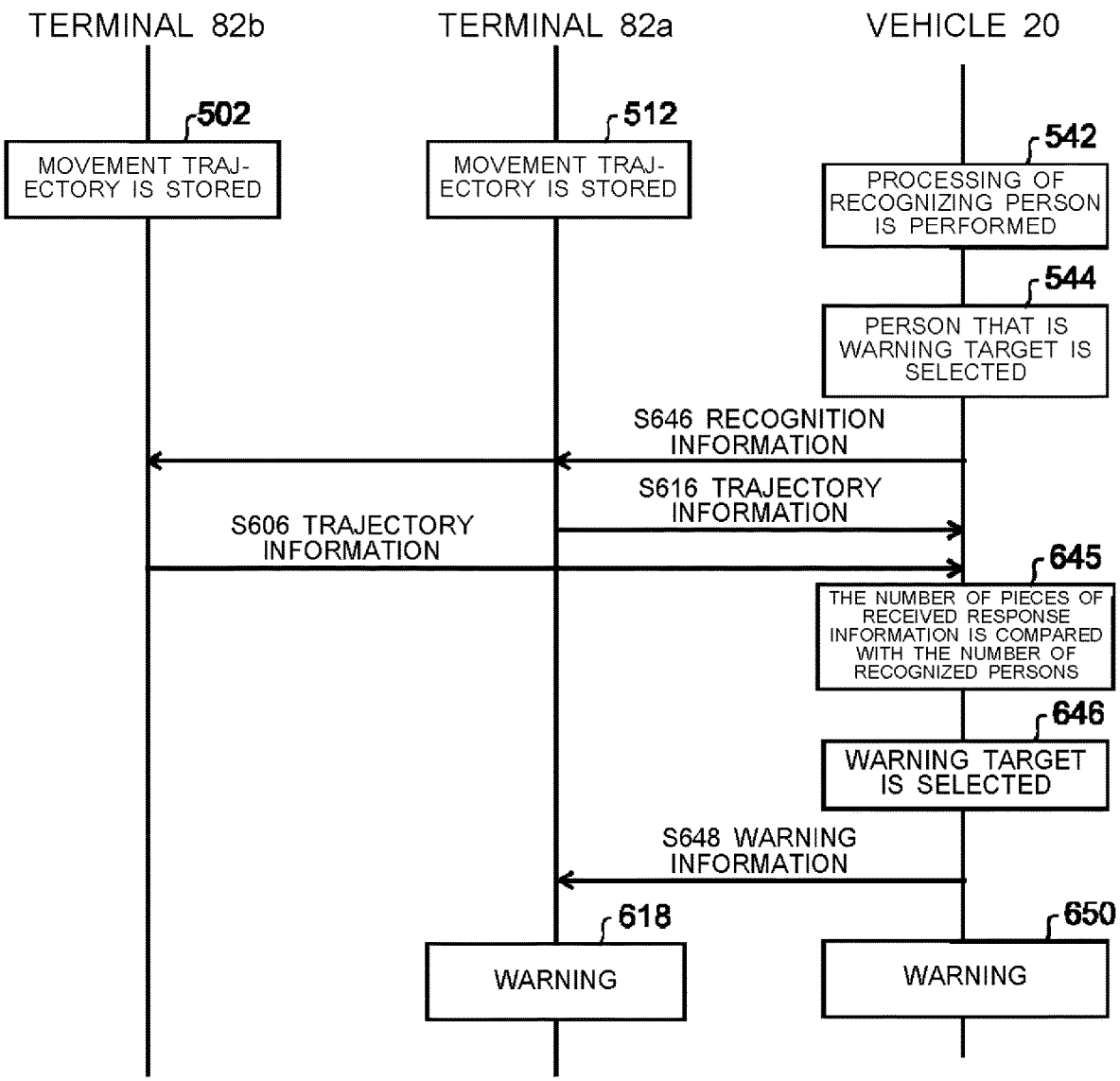
FIG. 5 schematically shows a flow of processing executed by the terminal 82, and the vehicle 20.

FIG. 5 schematically shows a flow of processing executed by the terminal 82, and the vehicle 20. FIG. 5 shows the flow of the processing when the control device 24 is responsible for the processing of selecting the warning target based on the trajectory information. It should be noted that the communication between the control device 24 and the terminal 82 may be performed through the PC5 interface.

The processing of S512, S502, S542, and S544 are the same processing as the processing of S512, S502, S542, and S544 in FIG. 4, and thus the description thereof will be omitted.

In S646, the recognition information including the recognition location information is transmitted to the terminal 82. If the terminal 82*a* receives the recognition information, the terminal 82*a* transmits the trajectory information to the control device 24 as the response information to the recognition information, in S616. In addition, the terminal 82*b* transmits the trajectory information to the control device 24 as the response information to the recognition information, in S606.

In S645, the number of pieces of the received response information including the trajectory information is compared with the number of the recognized persons, and it is determined whether the number of pieces of the received response information is larger than the number of the recognized persons. Under the situation shown in FIG. 1, while the one person is recognized, the number of pieces of the received response information is two, and thus it is determined that the number of pieces of the received response information is larger than the number of the recognized persons. In this case, in S646, the selection unit 240 selects the warning target based on the trajectory information received from the terminal 82*a* and the terminal 82*b*. For example, the selection unit 240 selects, as the warning target, the terminal 82 that has been on the road 70 for a period from a current time to a predetermined time before, based on the trajectory information of the terminal 82. For example, the selection unit 240 determines that the terminal 82*a* is on the road 70, and selects the terminal 82*a* as the warning target. On the other hand, the selection unit 240 determines that the terminal 82b is not on the road 70, and does not select the terminal 82b as the warning target.

In S648, the transmission control unit 250 transmits the warning information to the terminal 82a selected, as the warning target, by the selection unit 240.

In S618, if the terminal 82a receives the warning information from the control device 24, the terminal 82a performs a warning operation similar to that in S518 of FIG. 4. In addition, in S650, the control device 24 performs the warning operation. For example, the output control unit 208 causes the warning information to be notified to the occupant in the vehicle 20 through the HMI function of the information output device 40.

It should be noted that if it is determined in S645 that the number of pieces of the received response information, and the number of the recognized persons match with each other, the selection unit 240 selects, as the terminal of the warning target, the terminal 82 that is a transmission source of the response information, in S646.

It should be noted that the processing described in relation to FIG. 5 makes it possible to select the warning target without going through the MEC server 52. The control device 24 may perform the processing described in relation to FIG. 5 when communicating with the MEC server 52 is not possible, and may perform the processing described in relation to FIG. 4 when communicating with the MEC server 52 is possible. A mode, in which the processing described in relation to FIG. 4 and the processing described in relation to FIG. 5 are performed in parallel may be adopted.

It should be noted that the communication between the control device 24 and the terminal 82 may be executed by the direct communication. For example, the control device 24 directly communicates with the terminal 82 by a short range direct communication in Cellular-V2X. The short range direct communication in the Cellular-V2X includes a communication method such as LTE-V2X PC5 and 5G-V2X PC5 (abbreviated as "PC5" in the present embodiment). As the direct communication, a mode in which Wi-Fi (registered trademark) and DSRC (Dedicated Short Range Communications) are used may be adopted. The control device 24 may perform the direct communication via the base station 50. As the direct communication, any direct communication method such as Bluetooth (registered trademark) may be adopted in addition to the Cellular-V2X and the DSRC (registered trademark). The control device 24 may directly communicate with the terminal 82 by using a communication infrastructure included in ITS (Intelligent Transport Systems: an advanced road transportation system).

With the warning system 10 described above, it is possible to reduce a possibility of warning for a notification of an approach of the vehicle 20, to a person who is not on the road such as a person in the house or a person taking a walk in the garden. This makes it possible to suppress an unnecessary warning to a person. In addition, it is possible to suppress a warning to the occupant of the vehicle 20 that there exists a person who does not seem to be on the road. Therefore, it is possible to give a more accurate warning to the occupant of the vehicle 20.

It should be noted that the vehicle 20 is an example of transportation equipment. An example of the transportation equipment includes an automobile such as a passenger car and a bus, a saddle riding type vehicle, a bicycle, or the like. In addition, an example of the moving body includes, other than a person, the transportation equipment such as the automobile such as the passenger car and the bus, the saddle riding type vehicle, and the bicycle.

Figure 6:
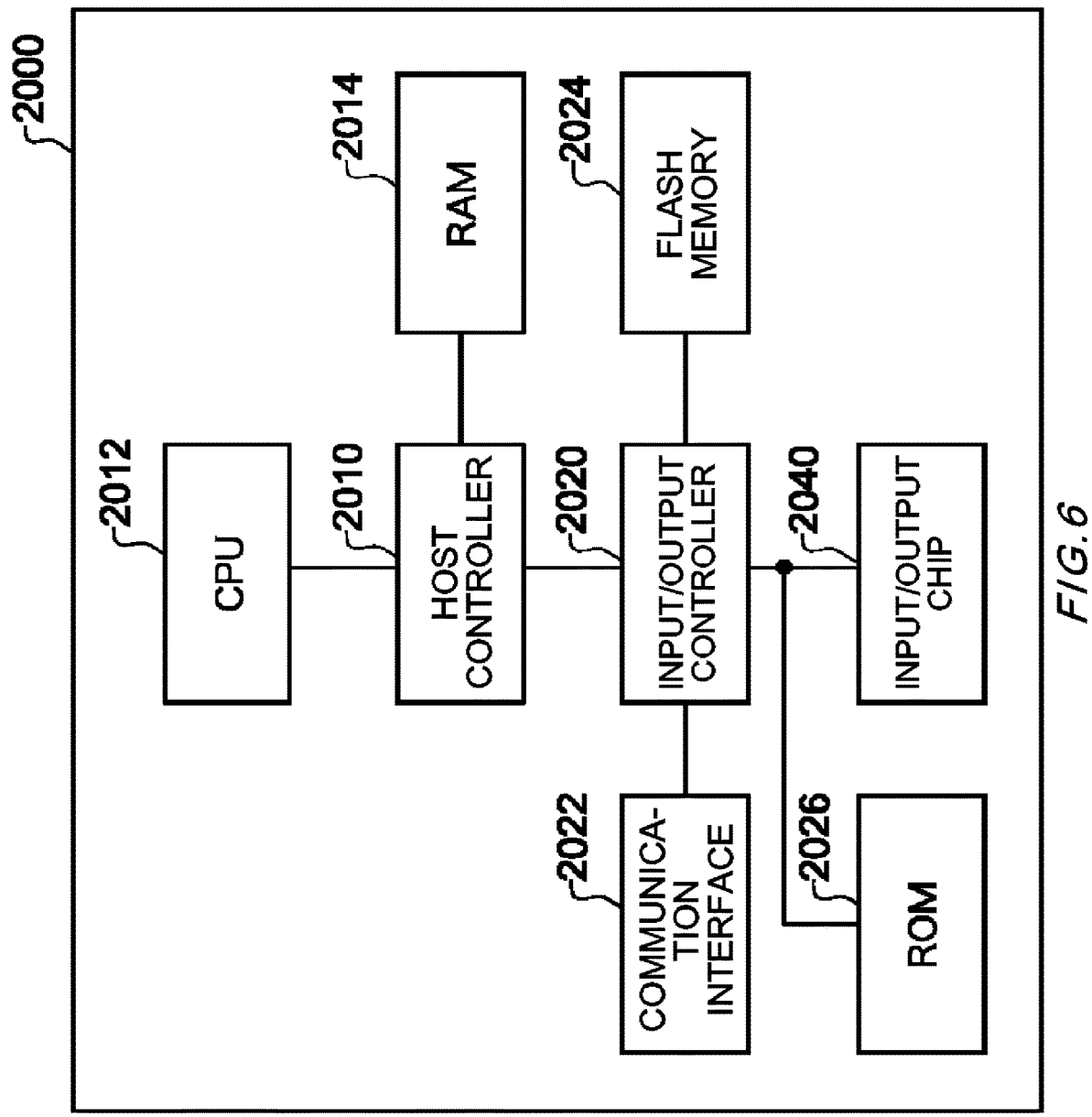
FIG. 6 shows an example of a computer 2000.

FIG. 6 shows an example of a computer 2000 in which a plurality of embodiments of the present invention may be entirely or partially embodied. A program installed on the computer 2000 can cause the computer 2000 to function as a device such as the control device 24 and the MEC server 52 or each unit of the device according to the embodiment, or cause the computer 2000 to execute an operation associated with the device or each unit of the device, and/or cause the computer 2000 to execute a process or steps of the process according to the above embodiment. Such a program may be executed by a CPU 2012 to cause the computer 2000 to execute the specific operation associated with some or all of the blocks of processing procedures and block diagrams described in the present specification.

The computer 2000 according to the present embodiment includes the CPU 2012, and a RAM 2014, which are interconnected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores programs and data used by the CPU 2012 in the computer 2000. The ROM 2026 stores a boot program or the like that is executed by the computer 2000 during activation, and/or a program that depends on hardware of the computer 2000. In addition, the input/output chip 2040 may connect various input/output units such as a keyboard, a mouse, and a monitor to the input/output controller 2020 via an input/output port such as a serial port, a parallel port, a keyboard port, a mouse port, a monitor port, a USB port, an HDMI (registered trademark) port.

A program is provided via a computer-readable medium such as a CD-ROM, a DVD-ROM, or a memory card, or a network. The RAM 2014, the ROM 2026, or the flash memory 2024 is an example of the computer-readable medium. The program is installed in the flash memory 2024, the RAM 2014, or the ROM 2026, and is executed by the CPU 2012. Information processing written in these programs is read by the computer 2000, resulting in cooperation between a program and the above-mentioned various types of hardware resources. An apparatus or method may be constituted by realizing the operation or processing of information in accordance with the usage of the computer 2000.

For example, when a communication is executed between the computer 2000 and an external device, the CPU 2012 may execute a communication program loaded in the RAM 2014, and instruct the communication interface 2022 to process the communication based on the processing written in the communication program. Under the control of the CPU 2012, the communication interface 2022 reads transmission data stored in a transmission buffer region provided in a recording medium such as the RAM 2014 and the flash memory 2024, transmits the read transmission data to the network, or writes received data which is received from the network to a receiving buffer region or the like provided on the recording medium.

In addition, the CPU 2012 may cause all or a necessary portion of a file or a database to be read into the RAM 2014, the file or the database having been stored in the recording medium such as the flash memory 2024, etc., and execute various types of processing on the data on the RAM 2014. The CPU 2012 then writes back the processed data to the recording medium.

Various types of information, such as various types of programs, data, tables, and databases, may be stored in the recording medium to undergo information processing. The CPU 2012 may execute various types of processing on the data read from the RAM 2014 to write back a result to the RAM 2014, the processing being described in the present specification, specified by instruction sequences of the programs, and including various types of operations, information processing, condition determinations, conditional branching, unconditional branching, information retrievals/replacements, or the like. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The program or software module described above may be stored in a computer-readable medium on the computer 2000 or near the computer 2000. A recording medium such as a hard disk or a RAM provided in a server system connected to a dedicated communication network or the Internet can be used as a computer-readable medium. The program stored in the computer-readable medium may be provided to the computer 2000 via the network.

A program, which is installed on the computer 2000 and causes the computer 2000 to function as the control unit 200, may work on the CPU 2012 or the like to cause the computer 2000 to function as each unit of the control unit 200. Information processing written in these programs functions as each unit of the control unit 200 that is specific means by which software and the above-described various hardware resources cooperate by being read by the computer 2000. Then, by the specific means realizing calculation or processing of information according to a purpose of use of the computer 2000 in the present embodiment, the unique control unit 200 according to the purpose of use is constructed.

A program, which is installed on the computer 2000 and causes the computer 2000 to function as the MEC server 52, may work on the CPU 2012 or the like to cause the computer 2000 to function as each unit of the MEC server 52. Information processing written in these programs functions as each unit of the MEC server 52 that is specific means by which software and the above-described various hardware resources cooperate by being read by the computer 2000. Then, by the specific means realizing calculation or processing of information according to a purpose of use of the computer 2000 in the present embodiment, the unique MEC server 52 according to the purpose of use is constructed.

Various embodiments have been described with reference to the block diagrams or the like. Blocks in the block diagrams may respectively represent (1) steps of processes in which operations are performed or (2) "units" of apparatuses responsible for performing operations. Certain steps and "units" may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits, and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

A computer-readable medium may include any tangible device that can store instructions to be executed by a suitable device, and as a result, the computer-readable medium having the instructions stored thereon constitutes at least a part of an article of manufacture including instructions which can be executed to create means for performing operations specified in the processing procedures or block diagrams. Examples of the computer-readable medium may include an electronic storage medium, a magnetic storage medium, an optical storage medium, an electromagnetic storage medium, a semiconductor storage medium, etc. Specific examples of the computer-readable medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disc (DVD), a Blu-ray (registered trademark) disc, a memory stick, an integrated circuit card, or the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general-purpose computer, special purpose computer, or other programmable data processing apparatus, or to programmable circuitry, locally or via a local area network (LAN), wide area network (WAN) such as the Internet, etc., so that the computer-readable instructions are executed to create means for performing operations specified in the described processing procedures or block diagrams. Examples of the processor include a computer processor, a processing unit, a microprocessor, a digital signal processor, a controller, a microcontroller, and the like.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 warning system
20 vehicle
21 radar
22 camera
24 control device
25 GNSS receiving unit
26 vehicle speed sensor
29 sensor
30 driver assistance control device
40 information output device
48 communication device
50 base station
52 MEC server
70 road
80 person
82 terminal
200 control unit
208 output control unit
220 acquisition unit
250 transmission control unit
260 reception control unit
280 storage unit
300 control unit
320 acquisition unit
330 specification unit
340 selection unit
350 transmission control unit
360 reception control unit
380 storage unit
2000 computer
2010 host controller
2012 CPU
2014 RAM
2020 input/output controller
2022 communication interface
2024 flash memory
2026 ROM
2040 input/output chip

What is claimed is:

1. A control device of a vehicle comprising:
an acquisition unit configured to acquire information indicating a location of at least one warning target, and a number of the at least one warning target, the at least one warning target being recognized from an image captured by an image capture device mounted on the vehicle;
a reception control unit configured to receive, from a plurality of external terminals including at least one of the plurality of external terminals that is carried by the at least one warning target acquired by the acquisition unit, stored trajectory information indicating a movement trajectory of each of the plurality of external terminals;
a selection unit configured to select, from among the plurality of external terminals, one or more external terminals that are identified to be the at least one warning target to receive warning information based on a comparison of the stored trajectory information indicating the movement trajectory of each of the plurality of external terminals and the acquired information, wherein a number of the plurality of external terminals is larger than the number of the at least one warning target acquired by the acquisition unit; and
a transmission control unit configured to perform a control to transmit warning information to the selected at least one warning target.

2. The control device according to claim 1, the control device being provided on the vehicle, wherein
the transmission control unit is configured to further perform a control to transmit, without specifying a destination, information including the location of the at least one warning target acquired by the acquisition unit,
the reception control unit is further configured to receive the stored trajectory information, from the plurality of external terminals, as a response to the warning information transmitted by the control of the transmission control unit, and
the transmission control unit is further configured to perform the control to transmit the warning information by specifying, as destinations, the one or more external terminals selected by the selection unit.

3. The control device according to claim 2, wherein
the selection unit is further configured to specify, among the plurality of external terminals, an external terminal that is not in an area where the vehicle is capable of traveling based on the stored trajectory information of each of the plurality of external terminals, and exclude the specified external terminal from the at least one warning target.

4. The control device according to claim 2, wherein
the transmission control unit is further configured to perform a control to transmit location information including coordinate information of the location of the at least one warning target acquired by the acquisition unit.

5. The control device according to claim 3, wherein
the transmission control unit is further configured to perform a control to transmit location information including coordinate information of the location of the at least one warning target acquired by the acquisition unit.

6. The control device according to claim 1, wherein
the at least one warning target corresponds to at least one person, and the plurality of external terminals are terminals that are carried by persons including the at least one person.

7. The control device according to claim 1, the control device being provided on an external server of the vehicle, wherein
the acquisition unit is further configured to receive, from the vehicle, the information indicating the location of the at least one warning target, and the number of the at least one warning target,
the control device further comprising:
a current location information acquisition unit configured to acquire current location information of the plurality of external terminals; and
a specification unit configured to specify one of the plurality of external terminals existing near the location of the at least one warning target received from the vehicle based on the current location information, wherein
the reception control unit is further configured to receive the stored trajectory information indicating the movement trajectory of each of the plurality of external terminals, the selection unit is further configured to select, from among the plurality of external terminals, the one or more external terminals that are identified to be the at least one warning target to receive the warning information based on the past movement trajectory of each of the plurality of external terminals, and the number of the plurality of external terminals specified by the specification unit is larger than the number of the at least one warning target received from the vehicle.

8. The control device according to claim 7, wherein the transmission control unit is configured to perform a control to transmit warning information to the external terminal specified by the specification unit when the number of the external terminals specified by the specification unit matches the number of the at least one warning target received from the vehicle.

9. The control device according to claim 7, wherein the at least one warning target corresponds to at least one person, and the external terminal is able to be carried by the at least one person.

10. The control device according to claim 7, wherein the server is a MEC server.

11. A moving body comprising the control device according to claim 1.

12. A control method of a vehicle comprising:

acquiring information indicating a location of at least one warning target, and a number of the at least one warning target, the at least one warning target being recognized from an image captured by an image capture device mounted on the vehicle;

receiving, from a plurality of external terminals including at least one of the plurality of external terminals that is carried by the acquired at least one warning target, stored trajectory information indicating a movement trajectory of each of the plurality of external terminals;

selecting, from among the plurality of external terminals, one or more external terminals that are identified to be the at least one warning target to receive warning information based on a comparison of the stored trajectory information indicating the movement trajectory of each of the plurality of external terminals and the acquired information, wherein a number of the plurality of external terminals is larger than the acquired number of the at least one warning target; and performing a control to transmit warning information to the selected at least one or more warning target.

13. A non-transitory computer-readable storage medium having stored thereon a program that causes a computer of a vehicle to perform operations comprising:

acquiring information indicating a location of at least one warning target, and a number of the at least one warning target, the at least one warning target being recognized from an image captured by an image capture device mounted on the vehicle;

receiving, from a plurality of external terminals including at least one of the plurality of external terminals that is carried by the acquired at least one warning target, stored trajectory information indicating a movement trajectory of each of the plurality of external terminals;

selecting, from among the plurality of external terminals, one or more external terminals that are identified to be the at least one warning target to receive warning information based on a comparison of the stored trajectory information indicating the movement trajectory of each of the plurality of external terminals and the acquired information, wherein a number of the plurality of external terminals is larger than the acquired number of the at least one warning target; and performing a control to transmit warning information to the selected at least one or more warning target.

* * * * *